UNITED STATES PATENT OFFICE.

KARL SCHIRMACHER, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

VAT-DYE AND PROCESS OF MAKING SAME.

No. 823,294.            Specification of Letters Patent.            Patented June 12, 1906.

Application filed December 21, 1905. Serial No. 292,859.

*To all whom it may concern:*

Be it known that I, KARL SCHIRMACHER, Ph. D., chemist, a citizen of the Empire of Germany, residing at Höchst-on-the-Main, Germany, have invented certain new and useful Improvements in the Manufacture of New Vat-Dyestuffs, of which the following is a specification.

I have found that a new valuable vat-dyestuff may be obtained by melting the glycin which is obtained from chloroacetic acid and dianthranilic acid with alkalies. To the melt may be added chemicals capable of binding water. The indoxyl melt thus obtained yields, if further worked in the usual manner, an insoluble dyestuff readily reducible to a vat and dyeing therefrom green shades.

The glycin of dianthranilic acid hitherto unknown may be prepared as follows: 31.6 kilograms of sodium dianthranilate are dissolved in water and a solution of 25.0 kilograms of sodium chloroacetate is added. The solution is heated in a reflux apparatus until the quantity of the separating yellow-brownish product no longer increases. It is filtered and washed with water. Warm water is poured over the residue, sodium carbonate being added until feeble alkaline reaction, and the solution is then evaporated to dryness to obtain the neutral glycin salt.

The manufacture of the dyestuff occurs, for instance, as follows: Twenty kilograms of the glycin sodium salt are introduced into a mixture, heated to about 250° centigrade, of about twenty kilograms of caustic-soda lye and twenty kilograms of caustic potash and heated to 270° to 280° centigrade for a short time. When cold, the mass is dissolved in water, and the new vat-dyestuff is then separated by oxidation, preferably by blowing in air, as green flakes. It is insoluble in water and the usual solvents. In concentrated sulfuric acid it dissolves to a green solution. It dyes, reduced to a vat, very fast green shades.

Having now described my invention, what I claim is—

1. The process for the manufacture of a vat-dyestuff, which consists in heating the glycin of dianthranilic acid with alkalies and oxidizing the indoxyl melt thus formed in the usual manner.

2. The process for the manufacture of a vat-dyestuff, which consists in heating the glycin of dianthranilic acid with alkalies and in presence of a chemical capable of binding water and oxidizing the indoxyl melt thus formed in the usual manner.

3. As new product the vat-dyestuff obtained by heating the glycin of the dianthranilic acid with alkalies, being a dark green-black powder insoluble in water and the usual solvents, soluble in concentrated sulfuric acid to a green coloration and reducible to a vat from which it dyes in fast green shades.

In testimony that I claim the foregoing as my invention I have signed my name in presence of two subscribing witnesses.

KARL SCHIRMACHER.

Witnesses:
    JEAN GRUND,
    CARL GRUND.